Figure 1:
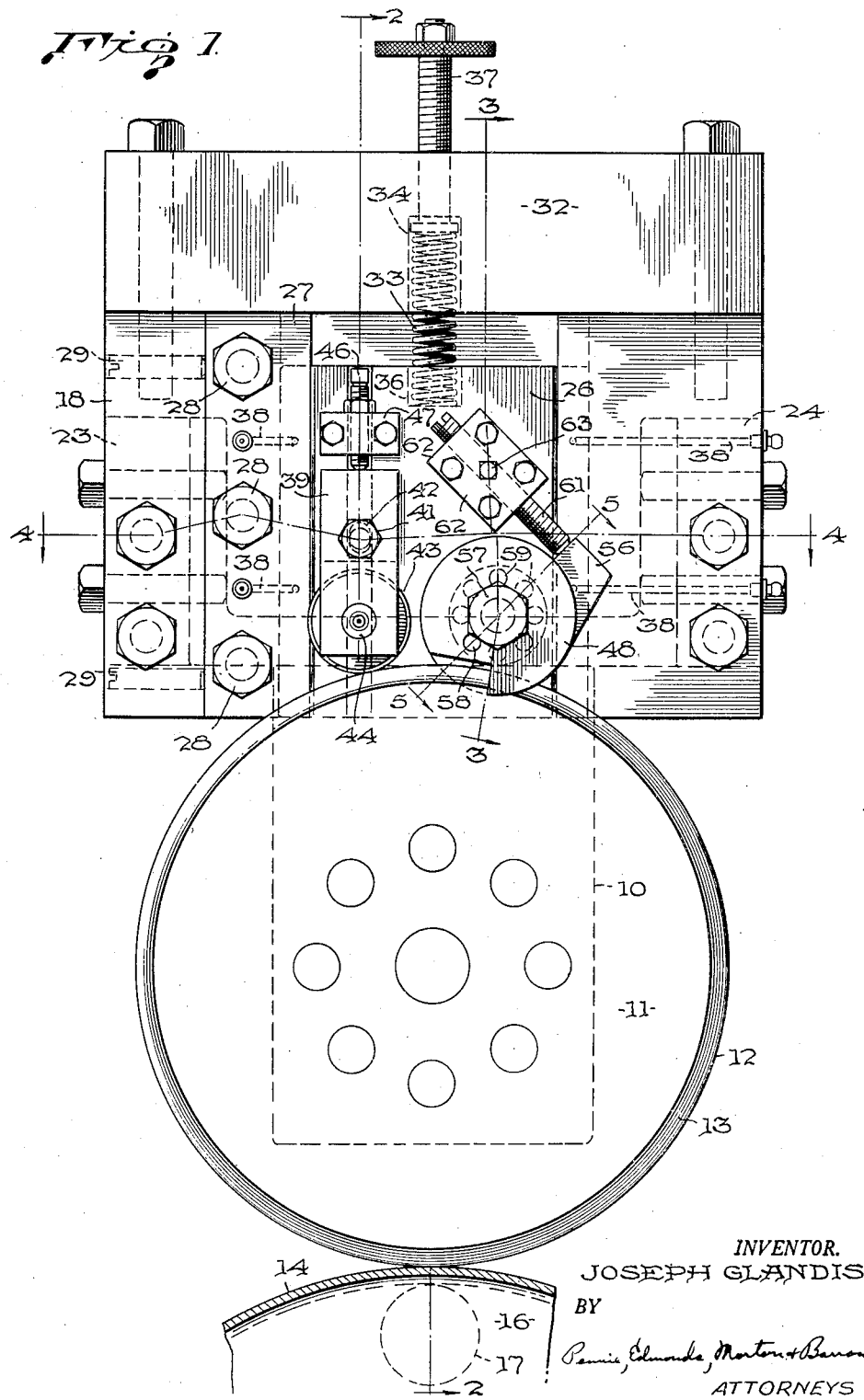

April 12, 1949.

J. GLANDIS 2,467,027

CLEANER AND TRIMMER FOR ROTARY
WELDING ELECTRODES

Filed July 16, 1948

3 Sheets-Sheet 1

INVENTOR.
JOSEPH GLANDIS
BY
Pennie, Edmonds, Morton + Barrows
ATTORNEYS

April 12, 1949.
J. GLANDIS
2,467,027
CLEANER AND TRIMMER FOR ROTARY
WELDING ELECTRODES
Filed July 16, 1948
3 Sheets-Sheet 2
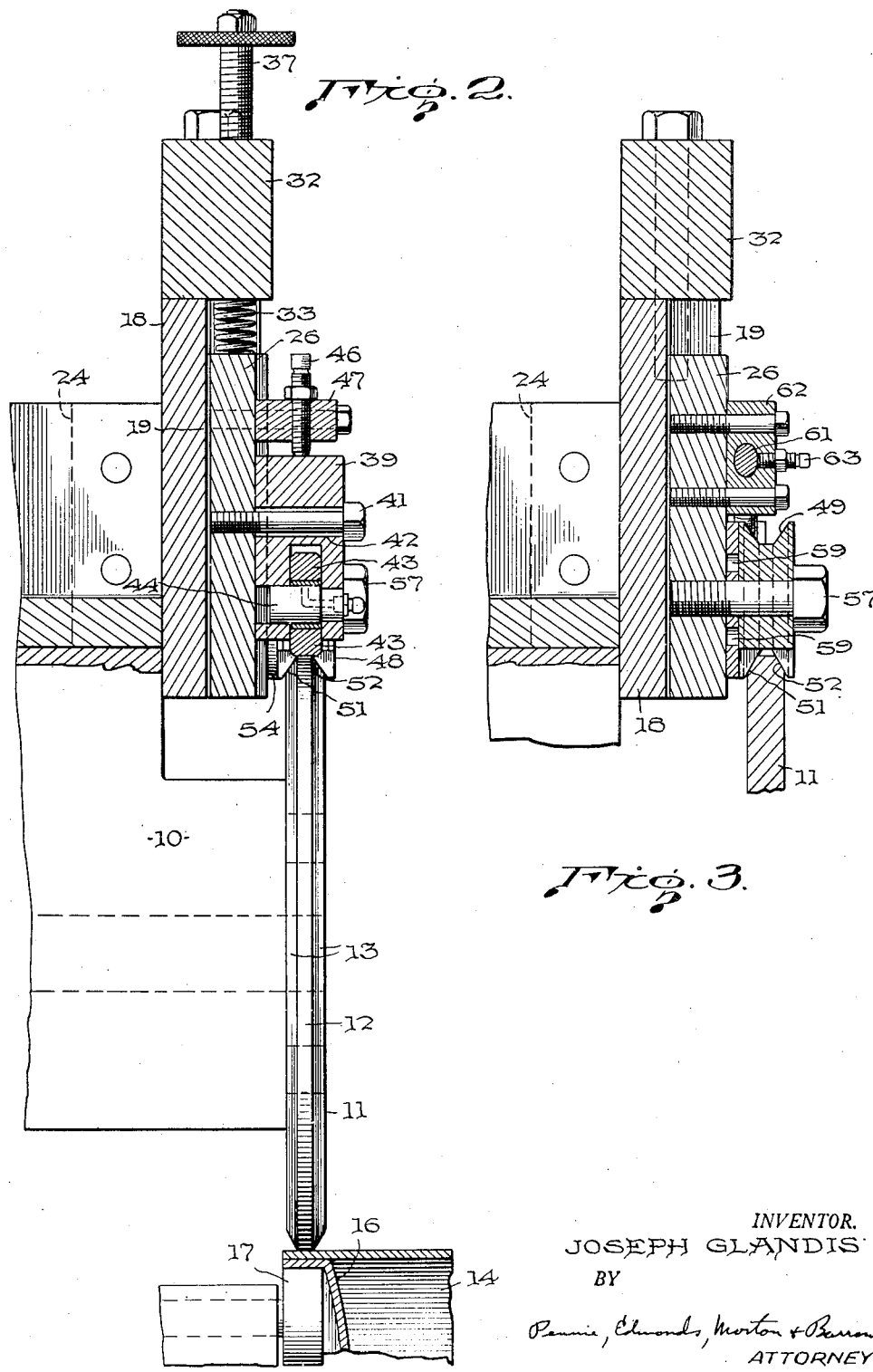
INVENTOR.
JOSEPH GLANDIS
BY
Pennie, Edmonds, Morton & Barrows
ATTORNEYS

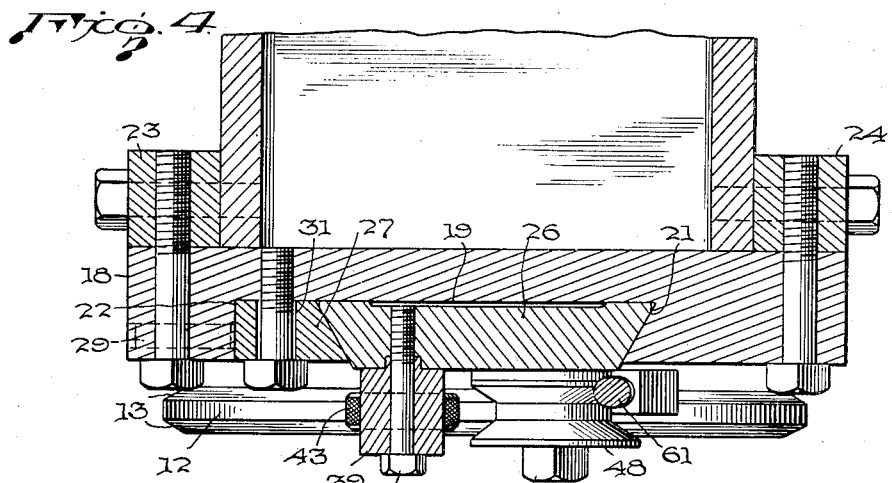
Fig. 4.
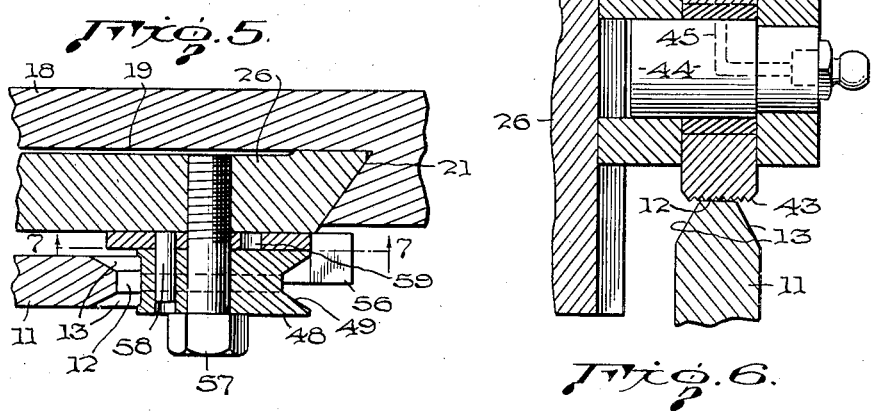
Fig. 5.
Fig. 6.
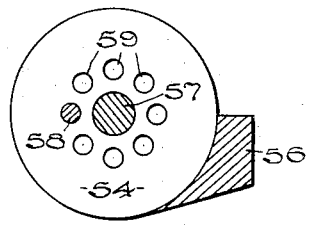
Fig. 7.
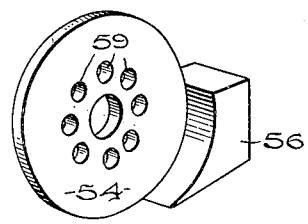
Fig. 8.
INVENTOR.
JOSEPH GLANDIS
BY
Pennie, Edmonds, Morton & Barrows
ATTORNEYS Patented Apr. 12, 1949

2,467,027

UNITED STATES PATENT OFFICE 2,467,027

CLEANER AND TRIMMER FOR ROTARY WELDING ELECTRODES

Joseph Glandis, Chicago, Ill., assignor to Rheem Manufacturing Company, San Francisco, Calif., a corporation of California Application July 16, 1948, Serial No. 39,058

10 Claims. (Cl. 219—4)

This invention relates to apparatus for seam welding and more particularly to apparatus for cleaning and dressing a rotatable electrode of a seam welding machine adapted for the welding of coated articles, such as terne plate, tin plate, galvanized iron, etc.

Seam welding is commonly accomplished by means of circular rotatable welding electrodes having relatively narrow peripheral welding surfaces which cause the pressure exerted by the electrode on the work to be localized in a relatively small area. If a firm, solid and non-porous seam is to be obtained in such welding it is necessary that the welding electrodes have clean, even welding surfaces, preferably free from material foreign to that of the electrodes.

While most plated and coated articles may be satisfactorily welded in a manner similar to that used in the welding of uncoated articles of similiar composition, it has been found that the welding of coated materials such as terne plate, tin plate and galvanized iron usually requires slightly higher welding pressures and welding currents than does the welding of the same uncoated base material. The welding of such articles coated with materials having low melting points gives some difficulty in that the coated materials tend to alloy with the material of the welding electrode surfaces and, in order to avoid the poorly welded seams which normally would result therefrom, it has been found that frequent cleaning and dressing of the electrode surfaces is required. For example, it has been found in seam welding galvanized articles that if foreign matter is allowed to accumulate on the welding surface of the electrode and the electrode surface is allowed to become uneven, poor weld penetration and porous seams are apt to result. Consequently it has been found necessary to continually dress the welding surface of the electrode to free it from excess accumulations of foreign matter and to maintain it even so that proper welding engagement between it and the work to be welded is assured.

Due to the relatively high pressure necessary for proper welding, the peripheral portions of the welding electrodes tend to mushroom or spread out. Such mushrooming or spreading may result in poorly welded seams due to the increase in the widths of the welding surface of the electrode and the resultant lessening of the pressure per square inch exerted by the electrode upon the work. Any such mushrooming or spreading out of the electrodes also results in a more rapid wearing away of them than is desirable. Consequently, a continual dressing of the peripheral portions of the electrodes is necessary in order to maintain them with the desired contour.

The higher welding pressures and currents necessary for seam welding coated articles tend to magnify both alloying of the coating material with the welding surface of the electrodes and the mushrooming or spreading of their peripheries.

It has been proposed to provide electrode trimmers, dressers and cleaners in the nature of form cutters driven by auxiliary means such as an electric motor. This practice is open to the objection that it is difficult to economically maintain the driving motors operable because the continuous quenching liquid spray, which accompanies the welding operation for the purpose of preventing the heat from spreading beyond the seam area and causing the surrounding material to become hot and to warp, tends to short-circuit the connections of the motor which usually has been mounted in the vicinity of the electrode. Also, it has been difficult to maintain the various driving connections between the motor and the trimmers, dressers and cleaners in efficient operable condition because of the likelihood of their becoming rusted or watersoaked.

The present invention contemplates means for cleaning and trimming the bevelled portions of an electrode adjacent its peripheral welding surface and for cleaning and dressing the welding surface of the electrode, which means are not subject to the above disadvantages.

More specifically, the present invention contemplates a cleaner and trimmer for the bevelled portions of the electrode adjacent its welding surface in the general form of a circular disc having an annular V-shaped groove in its peripheral face and generally radially-extending cutting edges formed therein and adapted to be adjustably positioned with respect to the bevelled surfaces of the electrode which they engage and maintain in proper contour. In maintaining the proper contour of the peripheral portion of the electrode the cleaner and trimmer necessarily determines the width of the peripheral welding surface of the electrode and also maintains the bevelled peripheral portions of the electrode adjacent the welding surface free from coating materials which tend to accumulate thereon.

The invention also includes a cleaner and dresser for the peripheral welding surface of the electrode in the form of a wheel having a knurled circumferential face which is urged into contact with the welding face of the electrode to break up and flake off the coating material tending to accumulate thereon and thereby maintain the welding surface even. The knurled wheel acts as a surface gauge for the welding surface of the electrode and also roughens that surface so that better traction is maintained and slippage prevented between it and the work to be welded during the welding operation.

Both the cleaner and trimmer and knurled dressing-wheel gauge are supported by an adjustable spring-urged slide slidable in a supporting framework mounted on or forming a part of the welding machine adjacent the electrode. The knurled dressing wheel is mounted so that it is adjustable longitudinally of the slide while the cleaner and trimmer is mounted so that it is rotatably adjustable in order that the positioning of its cutting edges with respect to the peripheral portion of the electrode may be changed as desired, and both are consequently urged into contact with the electrode as a result of being mounted on the spring-urged slide. Thus the knurled dressing wheel and the cleaner and trimmer are mounted upon the slide so that their positions relative to one another may be changed and both may be urged into contact with the electrode with the same force or one or the other may be urged into contact with the electrode under greater or lesser pressure; this being entirely within the control of the operator to change at will depending upon whether or not he desires to increase the magnitude of the cleaning and trimming operation on the bevelled faces adjacent the welding surface of the electrode or the magnitude of the operation responsible for breaking up the accumulation of foreign material on the peripheral welding surface of the electrode. The magnitude of the force with which the knurled dressing wheel and cleaner and trimmer are urged into contact with the electrode is partially dependent upon the force with which the spring urges the slide, upon which they are mounted, toward the electrode and partially upon their relative positions on the slide.

The invention will be further described in connection with a seam welding apparatus for welding the bottoms of galvanized tanks to the tank bodies and in connection with the accompanying drawings which show a seam welding machine adapted to be used for this purpose and embodying the apparatus of the present invention. However, it is to be understood that such further and detailed description is not to be construed as limiting the scope of the invention to any greater degree than that set forth in the appended claims.

In the drawings:

Fig. 1 is a front elevational view showing the cleaning and trimming apparatus mounted upon a welding machine, the electrode of the welding machine, and a portion of the work to be welded, Fig. 2 is a sectional view taken along line 2—2 of Fig. 1, Fig. 3 is a sectional view taken along line 3—3 of Fig. 1, Fig. 4 is a sectional view taken along line 4—4 of Fig. 1, Fig. 5 is an enlarged sectional view taken along line 5—5 of Fig. 1, and showing in greater detail the structure of the cleaner and trimmer and the means for adjustably securing it to the slide on which it is mounted, Fig. 6 is an enlarged detail sectional view showing the mounting of the knurled wheel for dressing the electrode welding surface and the manner of its engagement with such surface, Fig. 7 is a partial sectional view taken along line 7—7 of Fig. 5 and shows in section the cleaner and trimmer supporting member, and Fig. 8 is a perspective view of such supporting member.

As shown in Figures 1 and 2, the electrode cleaning and trimming device is mounted upon a seam welding machine 10 which supports and drives a rotatable welding electrode 11 of a conventional type having a narrow peripheral welding surface 12 and bevelled faces 13 receding therefrom to the body of the electrode. Also shown is a portion of a galvanized tank body 14 to which a galvanized bottom 16 is to be attached by seam welding. A wheel 17 is mounted in any suitable manner to act as a support for the portion of the tank body and bottom to be welded together and maintains them firmly in position to withstand the pressure with which the electrode 11 is urged against them. The pressure with which the electrode is maintain in contact with the article to be welded is accomplished in the usual manner by spring-urging that portion of the welding machine supporting the electrode in a direction toward the work. The urging means is such that as the electrode wears away in use it is continually maintained in contact with the work piece under a constant pressure; and as the cleaning and trimming apparatus for the electrode is mounted upon the same portion of the welding machine that supports electrode, it too is maintained in the same relative position with respect to the electrode as the electrode wears away and decreases in size.

The cleaning and trimming apparatus is supported by a dove-tailed guide member 18 having a guide way 19 formed therein with one lateral edge being undercut at 21 while the other lateral edge 22 extends perpendicularly from the face of the guide member. The guide member is adapted to be connected to the welding machine by connecting members 23 and 24 bolted respectively to the rear face of the guide member at the opposite edges thereof and to the vertically extending sides of the electrode supporting portion of the welding machine.

A slide 26 is mounted within the guide way 19 and maintained in place therein by slide-retaining member 27. The slide-retaining member is secured in place by bolts 28 extending therethrough into the guide member 18 and is adapted to be adjusted laterally thereof by threaded studs 29 to increase or decrease the force with which it bears against the adjacent edges of the slide, the holes 31 through which the bolts pass being sufficiently larger than the bolts to permit such lateral adjustment of the slide-retaining member.

A crosshead 32 is bolted or otherwise secured across the upper end of the guide member. A spring 33 has its opposite ends received respectively in a recess 34 in the crosshead and a recess 36 in the upper surface of the slide. A stud 37 is threadably adjustable longitudinally within the crosshead and has its inner end bearing against the upper end of the spring. The spring normally urges the slide longitudinally of the guide, in a direction toward the electrode, with a force dependent upon the longitudinal adjustment of the stud 37 in the crosshead. Frictional surfaces of the slide, the slide retaining member and the undercut portion of the guide member may be lubricated through grease conduits 38.

A bearing member 39 having a bifurcated lower end is mounted for vertical adjustment upon the face of the slide and held in place thereon by a bolt 41 passing through a vertical elongated slot 42 in the bearing member and threadably engaging the face of the slide. A knurled roller 43 is mounted between the spaced lower arms of the bearing member on a journal pin 44 having therein a grease conduit 45. A set screw 46 is threadably mounted within a member 47 firmly bolted or otherwise secured to the face of the slide above the bearing and has its lower end bearing upon the upper face of the bearing member. In order to adjust the bearing member longitudinally of the slide, the bolt by which it is secured to the face of the slide is first loosened and the set screw 46 then adjusted in accordance with the desire of the operator, either to position the bearing member outwardly or to allow it to be positioned inwardly of its instant position. As the knurled wheel is supported firmly upon the slide, it is continually subject to the pressure of the spring 33 which urges the slide and is forced into contact thereby with the welding face of the electrode with a force sufficient to break up the accumulation of zinc or other coating material thereon causing it to flake off and maintains an even, roughened surface which will give good traction between the welding surface of the electrode and the work and thereby prevent slippage during the welding operation.

The cleaner and trimmer 48 generally is in the shape of a circular disc having a V-shaped groove 49 formed in its peripheral edge, the shape of the groove generally conforming to the contour of the peripheral portion of the electrode. A portion of the peripheral edge of the cleaner and trimmer 48 is machined away to form cutting edges 51 and 52 for the bevelled faces adjacent the welding surface of the outer edge portion of the electrode. The cutting edges normally lie on a radius of the electrode and define an included angle equal to the normal included angle of the bevelled faces so that as the electrode rotates they will bear against the beveled faces at the opposite sides of the electrode adjacent the welded surface and act as cutters and cleaning members to trim and maintain the bevelled faces of the electrode in proper contour and to remove any accumulation of coating material therefrom. The depth of V-shaped groove 49 in the periphery of the cleaner and trimmer is such that when the cutting edges engage the bevelled faces of the electrode, the base of the groove is spaced slightly from the welding face of the electrode so that it performs no trimming or cleaning function with respect to it.

The cleaner and trimmer is adjustably mounted on a supporting member comprising a disc-like portion 54 and a lug portion 56 extending from its periphery. The supporting member is supported by stub shaft 57, in the form of a bolt extending from the face of the slide 26 adjacent the knurled wheel bearing member which holds both the supporting member and the cleaner and trimmer to the outer face of the slide. The cleaner and trimmer is mounted on the supporting member for angular adjustment by a dowel pin 58 which passes therethrough and extends into any one of a series of concentrically arranged holes 59 formed in the supporting member. As the supporting member is rotatably adjustable on the stub shaft, the angular position of the cutting edges 51 and 52 of the trimmer and cleaner radially of the electrode may be altered. This angular adjustment may be accomplished by an adjusting screw 61 threadably mounted in block 62 fixedly secured to the outer face of the slide above and adjacent the cleaner and trimmer support. In order to position the cleaner and trimmer so that its cutting edges lie in the preferred radial direction with respect to the electrode, it is first mounted upon the supporting member by placing the dowel pin in one of the series of holes in the supporting member so that its cutting edges lie roughly in the desired position. Then the screw 61 is threadably adjusted within the block 62 so that its lower end will abut the lug of the supporting member and accurately angularly rotate both the supporting member and the cleaner and trimmer until the desired positioning of the cutting edges is achieved. After the adjusting screw 61 has been so manipulated to the desired adjustment position, it is set in place and prevented from further threadable motion by a set screw 63 mounted in the block 62. When it is desired to change the angular position of the cutting edges of the trimmer, the set screw 63 may be loosened and the screw 61 threadably adjusted to a new position within the block member and the set screw then reset. As the circular cleaner and trimmer is mounted upon the slide 26 and the slide in turn is spring-urged by the spring 33 acting upon its upper end, the cutting edges of the cleaner and trimmer are, as the electrode rotates, spring-urged into contact with the bevelled edges thereof with a force sufficient to trim them and thus maintain the peripheral portions of the electrode adjacent its welding face in the proper and desired shape for continuous welding. The cutting edges also serve to clean the bevelled faces of the electrode and maintain them free from possible accumulations of coating material.

As the knurled wheel is longitudinally positionable on the front of the slide, the relative positions of it and the circular cleaner and trimmer to one another may be changed so that the proper pressure with which each is urged against the electrode periphery may be maintained. This pressure of each is primarily dependent upon the positioning of the spring-compressing stud 37 in the crosshead 32. Thus, the maximum pressure with which either may be urged into contact with the electrode is no greater than that exerted by the spring upon the slide.

While, normally, the pressures with which the knurled wheel and the cleaner and trimmer are urged against the peripheral portion of the electrode are the same, it may at times, be desirable to adjust the position of the knurled wheel so that the relative pressure with which it bears against the welding face of the electrode is greater or less than that with which the cleaner and trimmer engages the bevelled faces of the electrode. For example, if particular difficulty is being had in breaking up the coating material accumulating upon the welding face of the electrode, it is desirable to increase the pressure with which the knurled wheel contacts the welding face. This may be accomplished by setting the knurled wheel supporting bearing forwardly of its normal position, that is outwardly of the slide, so that the knurled wheel will exert the major portion of the pressure, available through the slide from the spring 33, upon the electrode. Contrarily, if the primary difficulty is with maintaining the proper contour of the electrode periphery, the knurled wheel may be retracted so that the cutting edges of the cleaner and trimmer will exert the major portion of the available pressure from the spring upon the electrode.

It should be noted that the differential division of the spring pressure between the knurled wheel and the cleaner and trimmer is possible because of the inherent resiliency of the parts urged into contact with one another and also because of the resiliency inherent in their mounting. Thus the achievement of the pressure differential is necessarily brought about by rather infinite adjustments of the adjustable members of the apparatus. Also, in some instances it may be desirable to have the cutting edges of the cleaner and trimmer spaced slightly out of contact with the bevelled faces of the peripheral portion of the electrode when such portion is of the proper contour. In such case the cutting edges are maintained in a position closely adjacent the bevelled faces of the electrode and perform a cleaning and trimming function only when undesirable mushrooming or spreading of that portion of the electrode occurs. In this case the knurled wheel is so adjusted that it exerts upon the electrode the entire pressure available from the spring.

As the cleaning and trimming apparatus is rigidly secured to that portion of the seam welding machine which carries the electrode, its position relative to the welding electrode will be maintained constant. Therefore, as the electrode wears away and the welding machine adjusts the position of the electrode to compensate therefor the cleaning and trimming apparatus will be similarly adjusted.

While the present invention has been described in connection with the welding of galvanized tank bottoms to galvanized tank bodies, it is to be understood that this is but one use therefor and that it is not to be limited thereby. Also, it is to be understood that various changes may be made in the details of the apparatus as described without departing from the invention or sacrificing the advantages thereof.

I claim:

1. In apparatus for seam welding including a rotatable circular welding electrode and supporting means therefor, cleaning and trimming means for the electrode which comprises a member mounted on the electrode supporting means for movement toward and away from the electrode, spring means for urging said member in a direction toward the electrode, conditioning means mounted upon said member and urged thereby into contact with the peripheral welding face of the electrode to maintain said face in proper condition for welding contact with a work piece, other means mounted upon said member and urged thereby into contact with the portion of the electrode adjacent the peripheral welding face to trim said portion and to maintain it with a predetermined contour, and means for adjusting said conditioning means and said other means relative to the electrode and independently of one another.

2. In apparatus for seam welding including a rotatable circular welding electrode and supporting means therefor, cleaning and trimming means for the electrode which comprises a member slidably mounted on the electrode supporting means, spring means for urging the slidable member in a direction toward the electrode, means mounted upon the slidable member and urged thereby into contact with the peripheral welding face of the electrode to maintain said face in proper condition for welding contact with a work piece, and other means mounted upon said slidable member and urged thereby into contact with the portion of the electrode adjacent the peripheral welding face to trim said portion and to maintain it with a predetermined contour, said other means being angularly spaced, with respect to the center of the electrode, from the means urged into contact with the welding face of the electrode.

3. Apparatus for seam welding as defined in claim 1 in which the means urged into contact with the welding face of the electrode is mounted upon the slidable member for adjustment toward and away from the electrode and in which the other means mounted upon said slidable member is mounted for angular adjustment.

4. In apparatus for seam welding including a rotatable circular welding electrode and supporting means therefor, cleaning and trimming means for the electrode which comprises a member slidably mounted on the electrode supporting means, spring means for urging the slidable member in a direction toward the electrode, means mounted upon the slidable member and urged thereby into contact with the peripheral welding face of the electrode to maintain said face in proper condition for welding contact with a work piece, and other means mounted upon said slidable member and urged thereby into contact with the portion of the electrode adjacent the peripheral welding face to trim said portion and to maintain it with a predetermined contour, the means urged into contact with the peripheral welding face and the other means urged into contact with the portion of the electrode adjacent the peripheral welding face being mounted upon the slidable member for relative adjustment with respect to one another, whereby the relative pressures with which each is urged against the electrode may be changed.

5. Apparatus for seam welding as defined in claim 1 in which the means urged into contact with the peripheral welding face of the electrode is a wheel having a knurled face bearing against the welding face of the electrode.

6. In apparatus for seam welding including a rotatable circular welding electrode and supporting means therefor, cleaning and trimming means for the electrode which comprises a member mounted on the apparatus for movement toward and away from the electrode, spring means for urging said member in a direction toward the electrode, conditioning means mounted upon said member and urged thereby into contact with the peripheral welding face of the electrode to maintain said face in proper condition for welding contact with a work piece, a cleaner and trimmer having an arcuate peripheral portion formed with a generally V-shaped groove having an open end, the faces defining the sides of the groove terminating in cutting edges at the open end of the groove, said cleaner and trimmer being so mounted upon said member that its cutting edges are urged by said member into contact with the portion of the electrode adjacent the peripheral welding face to clean and trim said portion and to maintain it with a predetermined contour, and means for adjusting said conditioning means and said cleaner and trimmer relative to the electrode and independently of one another.

7. In apparatus for seam welding including a rotatable circular welding electrode and supporting means therefor, cleaning and trimming means for the electrode which comprises a supporting framework mounted on the electrode supporting means, a member slidably mounted on the supporting framework, spring means for urging the slidable member in a direction toward the electrode, means mounted upon the slidable member and urged thereby into contact with the peripheral welding face of the electrode to maintain said face in proper condition for welding contact with a work piece, a cleaner and trimmer having an arcuate peripheral portion formed with a generally V-shaped groove having an open end, the faces defining the sides of the groove terminating in cutting edges at the open end of the groove, a supporting member for the cleaner and trimmer mounted upon the slidable member, means for adjustably and non-rotatably mounting said cleaner and trimmer upon the supporting member, and means for angularly adjusting said supporting member, said cleaner and trimmer being so mounted upon its supporting member that its cutting edges are urged by said supporting member and said slidable member into contact with the portion of the electrode adjacent the peripheral welding face to clean and trim said portion and to maintain it with a predetermined contour.

8. In apparatus for seam welding including a rotatable circular welding electrode and supporting means therefor, means for dressing the peripheral welding face of the electrode which comprises a member slidably mounted on the electrode supporting means, spring means for urging the slidable member in a direction toward the electrode, a bearing member adjustably mounted upon the outer face of the slidable member, a wheel having a knurled peripheral face rotatably supported by the bearing member, the bearing member being so urged by the slidable member in a direction toward the electrode that the knurled face of the wheel is urged into contact with the peripheral welding face of the electrode to maintain said face in proper condition for welding contact with a work piece.

9. In apparatus for seam welding including a rotatable circular welding electrode and supporting means therefor, cleaning and trimming means for the peripheral portion of the electrode adjacent its welding face which comprises a supporting framework mounted on the electrode supporting means, a member slidably mounted on the supporting framework, spring means for urging the slidable member in a direction toward the electrode, and a member having an arcuate peripheral portion formed with a generally V-shaped groove, the faces defining the sides of the groove terminating in cutting edges at one end of the groove, the member having the V-shaped groove being angularly adjustable upon the slidable member to permit relative angular positioning of the cutting edges with respect to the electrode and its cutting edges being urged by the slidable member into contact with the portion of the electrode adjacent the welding face to clean and trim said portion and to maintain it with a predetermined contour.

10. In apparatus for seam welding including a rotatable circular welding electrode and supporting means therefor, cleaning and trimming means for the electrode which comprises a member slidably mounted on the electrode supporting means, spring means for urging the slidable member in a direction toward the electrode, means mounted upon the slidable member for adjustment toward and away from the electrode and urged by said slidable member into contact with the peripheral welding face of the electrode to maintain said face in proper condition for welding contact with a work piece, and other means mounted upon said slidable member for angular adjustment and urged by said slidable member into contact with the portion of the electrode adjacent the peripheral welding face to trim said portion and to maintain it with a predetermined contour.

JOSEPH GLANDIS.

REFERENCES CITED

The following references are of record in the file of this patent:

UNITED STATES PATENTS

| Number | Name | Date |
|---|---|---|
| 1,862,108 | Brueckner | June 7, 1932 |